Oct. 30, 1951　　　F. E. HUMMEL　　　2,572,934
EGG BOILER

Filed April 1, 1949　　　　　　　　　　　2 SHEETS—SHEET 1

INVENTOR.
Frederick E. Hummel
BY Fred Gerlach
Atty.

Oct. 30, 1951      F. E. HUMMEL      2,572,934

EGG BOILER

Filed April 1, 1949      2 SHEETS—SHEET 2

INVENTOR.
Frederick E. Hummel
BY
Atty.

Patented Oct. 30, 1951

2,572,934

UNITED STATES PATENT OFFICE 2,572,934

EGG BOILER

Frederick E. Hummel, Chicago, Ill.

Application April 1, 1949, Serial No. 84,839

3 Claims. (Cl. 99—336)

This invention relates generally to cooking utensils and has to do more particularly with an improved egg boiler having built-in timing means operative automatically to withdraw the eggs from the hot water at the termination of a prescribed cooking period.

While I am immediately concerned with the provision of a utensil intended more specifically for boiling eggs, it will become apparent as the ensuing description progresses that my invention is adaptable to a wide variety of applications both within and extraneous to the culinary art.

One of the primary objects of this invention is to provide a utensil of the above-indicated character of simple design and durable construction which can be manufactured at a cost such as will place it within the reach of people of modest means to whom an automatic egg boiler would otherwise be an unwarrantable extravagance.

Another object is to provide an automatically timed egg boiler comprising a plurality of egg receptacles which are individually immersible and capable of being separately timed, so that the egg or eggs in any one receptacle can be timed independently of those contained in the other receptacles—thus rendering it practicable to boil several orders of eggs simultaneously and to time each order independently of the others.

The egg boiler herein described as a representative embodiment of the invention comprises three egg receptacles which are individually and independently operable. Such a utensil is especially well adapted to the needs of large families and small restaurants. But for small family use the invention may desirably be embodied in a utensil comprising only one egg receptacle or, perhaps, two, whereas for large restaurants and the like the over-all dimensions may appropriately be increased and an additional number of receptacles included.

The novel features of my invention are set forth in conjunction with the detailed description which follows; and said features are defined explicitly in the appended claims.

Referring to the drawings.

Figure 2:
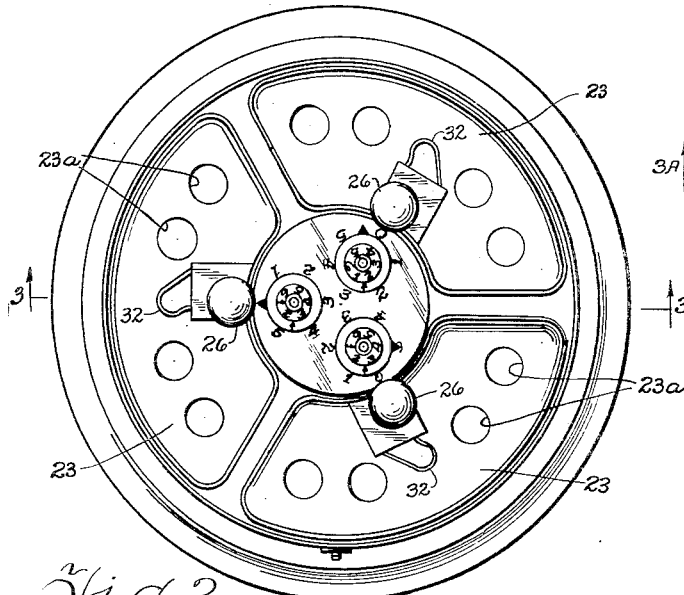
Fig. 2 is a plan view of the same.

The utensil illustrated comprises a cylindrical tank 10 including a vertical sheet metal wall 12 and a bottom plate 14 having an annular recess in which is disposed an electric heating element 15 of annular form. Said tank may be equipped, as shown, with a base 16 on which it is supported.

The bottom plate 14 divides the tank into an upper chamber 18 and a lower chamber 20—said upper chamber being adapted to contain a quantity of water in which the eggs are to be immersed.

Extending upwardly from the bottom plate 14 and welded or brazed thereto at its lower end is a tubular sheet metal housing 21 defining a compartment 22 which is concentrically located within the chanber 18.

Figure 3B:
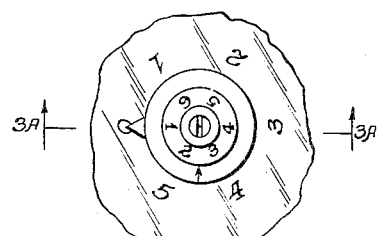
Fig. 3b is a plan view of the timing and time-recording knobs.
Figure 3A:
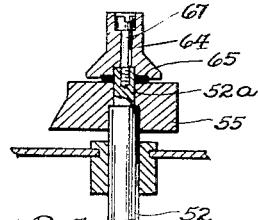
Fig. 3a is an enlarged detail of the timing and time-recording knobs.
Figure 3:
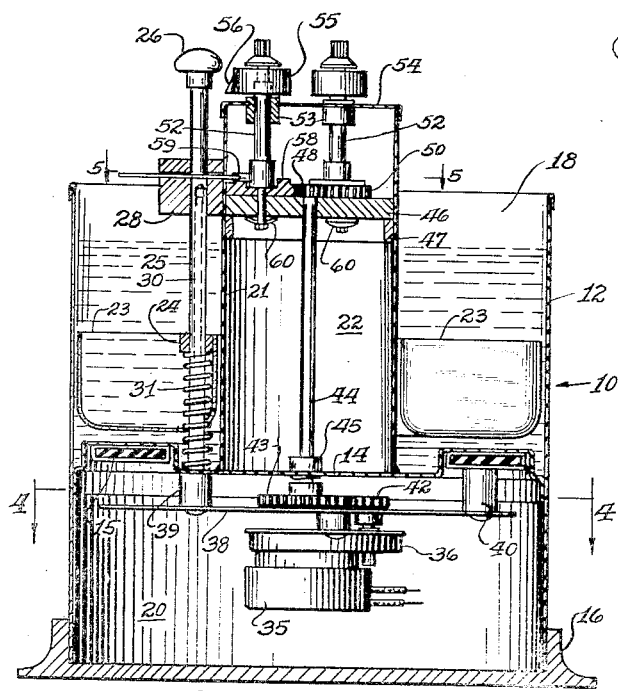
Fig. 3 is a vertical section taken at line 3—3 of Fig. 2.

Three segmental sheet metal receptacles 23, each designed to hold two or more eggs are arranged symmetrically about the housing 21, within upper chamber 18; and each said receptacle is attached to a small metal block 24 to which, in turn, is connected a vertical plunger rod 25 having a knob 26 at its upper end. Each said plunger rod 25 is slidably journaled in a bearing block 28 rigidly secured to the outer surface of the housing 21, and is reciprocable vertically, together with its attached receptacle 23, between the depressed position illustrated in Fig. 3 and an alternate elevated position which is determined by engagement between the top of block 24 and the bottom of bearing block 28.

The lower portion of plunger rod 25 is drilled axially to receive telescopically a guide pin 30 which is secured at its lower extremity, as by riveting, to the bottom plate 14; and a coil spring 31 encircling said guide pin 30 presses upwardly against block 24, thus biasing the associated receptacle 23 toward its elevated position.

Each block 28 carries a wire spring latch 32 which is anchored at one end to said block and is adapted to engage an annular groove in the plunger rod 25 whenever said plunger rod is depressed to its down position, as shown. Each spring latch 32 thus serves to releasably lock its associated receptacle 23 in the down position until said latch is forcibly withdrawn from the aforementioned annular groove in response to the automatic timing provision which presently will be described.

It will be evident that any eggs, or other articles, contained in a depressed receptacle 23 will be immersed in the water in upper chamber 18 and will be held in immersion until the spring latch 32 is actuated to release plunger rod 25; and it goes without saying that the water in chamber 18 is kept at boiling temperature by the heater element 15.

Each receptacle 23 is provided with a number of bottom openings 23a to permit ready ingress and egress of water.

Figure 7:
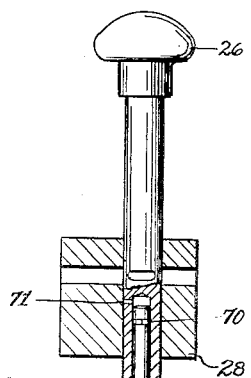
Fig. 7 is a sectional view depicting an alternative detail.

The water in upper chamber 18 is effective as a brake on each of the receptacles 23 and thus tends to prevent overly abrupt upward movements thereof such as might result in water being splashed out of said chamber; but as a further precaution against water expulsion I consider it prudent to supplement the restraining action of the water through the addition of either a friction brake or a dashpot. To that end there may be provided in the bearing block 28 a tapped lateral opening extending into the bore through which passes the plunger rod 25; and in said opening there may be placed a brake shoe in the form of a small piece of indurated fiber or other suitable brake shoe material, together with a spring arranged to press the brake shoe against the side of plunger rod 25, and a screw forming an abutment for the spring. Such a provision is indicated at 34 in Figs. 3 and 5. An alternative restraining provision involving the use of a dashpot is shown in Fig. 7 and will be described later.

A small synchronous electric motor 35 having a built-in reduction gear 36 is attached to the under side of a mounting plate 38 which, in turn, is suspended through the agency of spacers 39 from the bottom plate 14; and said mounting plate 38 is provided with the number of upstanding lugs 40 which serve to support the heating element 15.

A small pinion 42 is attached to the low-speed drive shaft of the motor reduction gear 36 and extends through an opening in the mounting plate 38 to the upper side thereof where it meshes with a spur gear 43 mounted on the lower end of a vertical shaft 44 which is journaled in a bearing 45, attached to bottom plate 14, and in a disc-like brass plate 46 which rests on a metal ring 47 brazed to the interior of the tubular housing 21.

Figure 5:
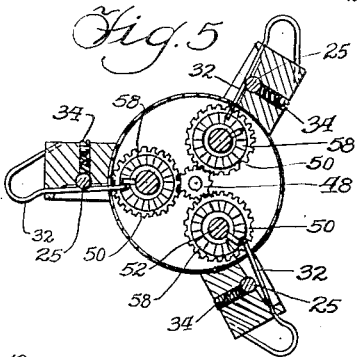
Fig. 5 is a section taken at line 5—5 of Fig. 3.
Figure 4:
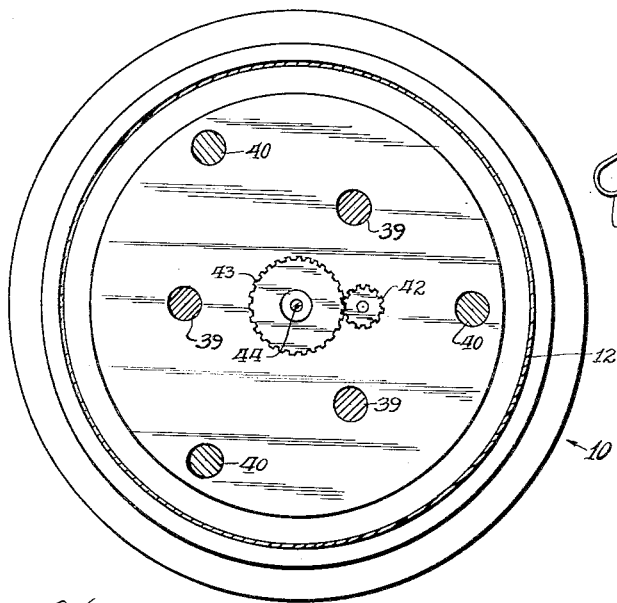
Fig. 4 is a section taken at line 4—4 of Fig. 3.

A spur pinion 48 is attached to and rotatable with shaft 44 and located above the plate 46 and is meshed with three spur gears 50 disposed symmetrically thereabout, as clearly shown in Fig. 5. Said spur gears 50 are centered individually on vertical shafts 52 but are not secured to said shafts, being rotatable relatively thereto; and they rest on the top surface of plate 46. The three shafts 52 are journaled at their lower ends in the plate 46 and at their upper ends in bearings 53 secured to a sheet metal cap 54 forming a closure for the upper end of the housing 21. Said shafts extend through their bearings 53 and the cap 54 and each is provided at its outer end with a knob 55 having an integral pointed indicator 56 which is adapted to register with numerical indicia applied to the top surface of cover 54, as clearly shown in Fig. 2. The arcuate spaces intervening successive numerals preferably correspond to periods of one minute each, and it will be apparent that one complete revolution of knob 55 is intended to occur, in the example here illustrated, in precisely six minutes. The synchronous motor 35 runs at a fixed speed, the rate of which is determined by the frequency of the alternating current with which it is supplied; and by selecting appropriate gear ratios the rate of revolution of gear 50 can be suitably predetermined.

Figure 6:
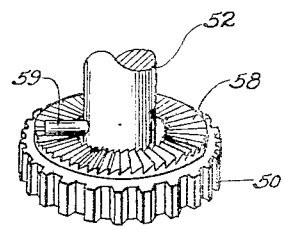
Fig. 6 is an enlarged perspective view of a portion of the timing mechanism.

The shaft 52 and knob 55 normally rotate with gear 50 by reason of a mechanical coupling comprising a crown ratchet wheel 58—see especially Fig. 6—formed integrally with gear 50 and having a circular row of saw-type teeth pointed in the counterclockwise direction, as viewed from above, and positioned for engagement by a dog 59 secured to and extending radially from shaft 52. The shaft 52 is spring-biased downwardly by a spring washer 60 which is secured to the lower end of said shaft and bears against the under side of plate 46. The axial yieldability of shaft 52 afforded by spring washer 60 allows the dog 59 to ride over the ratchet teeth whenever shaft 52 is rotated manually in the direction of rotation of the ratchet wheel 58. But because the ratchet teeth are of saw-tooth form, said dog is not normally capable of being rotated in the opposite direction relatively to said ratchet wheel, although it is possible to do so by first pulling up on knob 55 so as to elevate the dog 59 above the ratchet teeth.

The free end of each spring wire latch 32 is disposed in the path of the associated dog 59 and is thus adapted to be laterally displaced by pressure exerted thereagainst by the dog and thereby withdrawn from the annular groove in plunger rod 25. It will accordingly be apparent that whenever the rotation of shaft 52 results in dog 59 being brought to bear laterally against the free end of the associated latch 32, the related plunger rod 25 will be released, if in its down position, thus enabling said plunger rod and the receptacle carried thereby to be elevated by the associated spring 31.

After the latch 32 has yielded sufficiently to release the plunger rod, it escapes the end of its dog 59 and the latter is thus made free to continue its rotation without interruption, as long as motor 35 continues to run.

The three shafts 52 rotate continuously and the three latches 32 are engaged and actuated by their respective dogs 59 once per revolution irrespective of whether their associated plunger rods 25 are up or down, but the action is of no effect save when a plunger rod is in down position.

Figure 1:
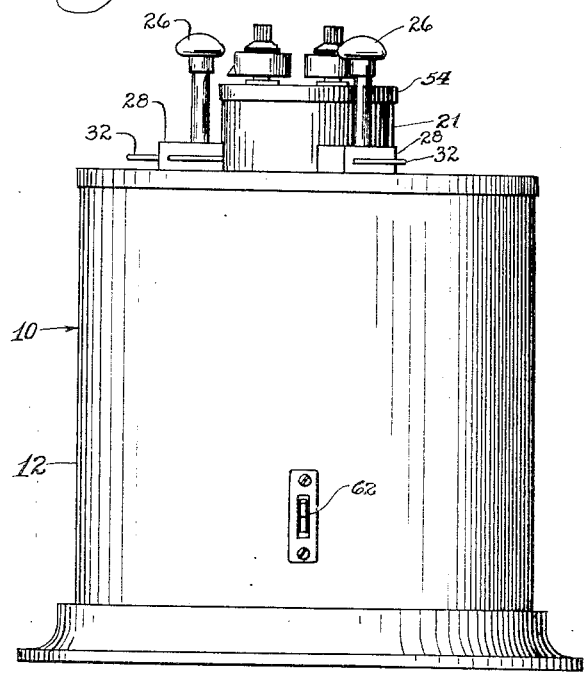
Fig. 1 is a view in elevation of a utensil according to the invention, in the form of a three-receptacle egg boiler.

An "on and off" switch 62 may be mounted in any convenient position, such as that depicted in Fig. 1, so that the utensil can be permanently plugged in. This is turned on after the chamber 18 has been filled with water to a suitable level. Element 15 is thereupon energized, causing the water to be brought to a boil, and the motor 35 is at the same time set into operation. When the water starts boiling, eggs are placed in one or more of the receptacles 23, and the knobs 55 adjacent the egg-holding receptacles are rotated, one at a time, so that their indicators 56 are brought into registration with a numeral corresponding to the number of minutes the eggs are to be immersed. Immediately upon setting each knob 55, the operator depresses the associated plunger rod 25 so that the eggs in the related receptacle 23 are immersed in the hot water; and the knob 55, together with shaft 52, continues to rotate. It will be apparent from inspection of Fig. 2 that the indicator 56, which is in vertical alignment with its related dog 59, will travel from any scale setting to the zero position in a period of time corresponding to the numeral at which it is set. For example, if the indicator 56 is set at numeral "4," a period of four minutes will elapse thereafter before said indicator arrives at registration with the zero indicium; and if the dog 59 and latch 32 are so adjusted that the plunger rod 25 is unlatched contemporaneously with the arrival of the indicator 56 at the zero indicium, the immersion time will correspond with a very high degree of accuracy to the indicator setting. It will be evident that the timing can be set to include fractions of a minute by positioning the indicator 56 at an appropriate intermediate scale point instead of at a major scale division.

At times it is required to boil the eggs in the several receptacles for different periods, and in order to obviate confusion it is desirable to provide means in association with each receptacle which will serve to inform the operator as to the length of time each order of eggs has been boiled. A convenient provision to that end is illustrated on an enlarged scale in Figs. 3a and 3b wherein it will be seen that the shaft 52 has a reduced upper end portion 52a which projects upwardly from the top of knob 55 and serves as a pedestal on which is rotatably mounted a small supplemental knob 64 having a dial portion 65 bearing equally spaced numerals "1" to "6" inclusive on its exposed surface. Said dial co-operates with a mark 66 on the top surface of knob 55 which serves to indicate by the numeral in registration therewith the period for which the related timer has been set. A shouldered screw 67 serves to secure the knob 64 in place while a spring washer 68 presses upwardly against the knob 64 and functions to provide a limited amount of frictional restraint against free rotation thereof. Whenever the need arises, the operator of the utensil can record the individual time periods by rotating the knobs 64 so as to bring the appropriate numerals into registration with the indicia 66.

In Fig. 7 there is illustrated an alternative construction wherein the plunger rod 25' is of larger diameter than the plunger rod 25 and is bored axially to receive a guide pin 30' of increased diameter as compared to guide pin 30. The guide pin 30' is grooved annularly to accommodate a sealing ring 70 which affords an air-tight joint. A small aperture 71 allows air to flow at a restricted rate into and out of the bore 72. The dashpot effect accomplished by this arrangement ensures against overly rapid upward movement of the receptacle 23 and is considered preferable to the friction brake 34 previously described.

While I have illustrated and described only one embodiment of my invention, it will be apparent that numerous modifications may be made within the scope and purview of my inventive concept and, accordingly, I do not wish to be limited otherwise than as indicated by the terms of the appended claims.

I claim:

1. The combination in a cooking utensil, of a liquid container, a receptacle within said container, a vertically reciprocable plunger rod attached to and extending upwardly from said receptacle, a spring continuously urging said receptacle and plunger rod upwardly, a spring-pressed latch operative to releasably secure said plunger rod and receptacle in a depressed position against the opposition of said spring, and timing mechanism operative to deactuate said latch, said timing mechanism comprising a ratchet wheel, a shaft disposed axially of said ratchet wheel and having means engageable by the teeth of said ratchet wheel whereby said shaft is rotatable by and with said ratchet wheel and manually rotatable independently thereof, a dog carried by said shaft and operative to move said latch once per revolution of said shaft in a direction effective to release said plunger rod and thus allow said receptacle to rise under the impetus of said spring, and means operative to rotate said ratchet wheel at a constant speed.

2. The combination in a cooking utensil, of a liquid container, a receptacle within said container, a vertically reciprocable plunger rod attached to and extending upwardly from said receptacle, a spring continuously urging said receptacle and plunger rod upwardly, a spring-pressed latch operative to releasably secure said plunger rod and receptacle in a depressed position against the opposition of said spring, and timing mechanism operative to deactuate said latch, said timing mechanism comprising a ratchet wheel having a vertical axis of rotation, a vertical shaft disposed axially of said ratchet wheel, a dog carried by said shaft and extending radially therefrom, said dog being drivably engageable by said ratchet wheel through the teeth thereof to rotate said shaft, a portion of said latch being positioned in the path of said dog and movable by said dog to release said plunger rod, said shaft being rotatable manually independently of said ratchet wheel, and a synchronous electric motor arranged to continuously rotate said ratchet wheel at a substantially constant speed.

3. The combination in an egg boiler, of a tank having a bottom plate defining an upper chamber and a lower chamber, a plurality of egg-holding receptacles situated within said upper chamber and disposed about the vertical axis thereof, a tubular vertical housing extending upwardly from said bottom plate through said upper chamber, axially of said tank, a plurality of vertical plunger rods individual to said receptacles and extending upwardly therefrom, spring means biasing said receptacles and plunger rods upwardly, latch means individual to said plunger rods for releasably securing said plunger rods, together with their respective receptacles in depressed positions, and timing mechanism operative to trip said latch means for releasing said plunger rods individually after predetermined time intervals, said timing mechanism including a synchronous electric motor situated in said lower chamber, a vertical drive-shaft located axially of said tank and extending through said bottom plate and through said housing, the lower end of said drive-shaft being connected to said motor through a speed-reduction gear train, a pinion connected to the upper end of said drive-shaft and rotatable therewith, a plurality of gears meshed with said pinion and disposed in planetary array therearound, said gears being individually associated with said plunger rods, ratchet wheels individual to said gears and rotatable therewith, time-setting shafts individual to said ratchet wheels and co-axial therewith respectively, and a plurality of dogs, each carried by one of said time-setting shafts and engageable by the teeth of the respectively associated ratchet wheel, said latch means each having a portion situated in the path of one of said dogs and actuable, each by its associated dog to release the associated plunger rod, said time-setting shafts and the dogs individual thereto being manually rotatable independently of their associated ratchet wheels.

FREDERICK E. HUMMEL.

(References on following page)

REFERENCES CITED

The following references are of record in the file of this patent:

UNITED STATES PATENTS

| Number | Name | Date |
|---|---|---|
| 284,051 | Obrien | Aug. 28, 1883 |
| 1,377,984 | Lamb | May 10, 1921 |
| 1,529,342 | Christy | Mar. 10, 1925 |
| 1,876,072 | Noonan | Sept. 6, 1932 |
| 1,977,454 | Price | Oct. 16, 1934 |
| 1,986,412 | Rudolph | Jan. 1, 1935 |
| 2,253,752 | Bemis | Aug. 26, 1941 |
| 2,274,190 | Cramer | Feb. 24, 1942 |
| 2,295,993 | Greuttner | Sept. 15, 1942 |
| 2,470,548 | Desjardins | May 17, 1949 |